US012371576B2

(12) United States Patent
Yabushita et al.

(10) Patent No.: US 12,371,576 B2
(45) Date of Patent: Jul. 29, 2025

(54) COATING COMPOSITION, COATED ARTICLE, AND METHOD FOR PRODUCING COATED ARTICLE

(71) Applicant: NIPPON PAINT AUTOMOTIVE COATINGS CO., LTD., Hirakata (JP)

(72) Inventors: Chisato Yabushita, Hirakata (JP); Tamami Uehara, Hirakata (JP); Kazuaki Sakoyama, Hirakata (JP); Sakura Kitagawa, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 18/838,352

(22) PCT Filed: Dec. 11, 2023

(86) PCT No.: PCT/JP2023/044222
§ 371 (c)(1),
(2) Date: Aug. 14, 2024

(87) PCT Pub. No.: WO2024/202274
PCT Pub. Date: Oct. 3, 2024

(65) Prior Publication Data
US 2025/0109306 A1    Apr. 3, 2025

(30) Foreign Application Priority Data

Mar. 28, 2023  (JP) ................................. 2023-051982

(51) Int. Cl.
| | |
|---|---|
| *C09D 5/29* | (2006.01) |
| *C08K 3/08* | (2006.01) |
| *C08K 3/22* | (2006.01) |
| *C08K 9/02* | (2006.01) |
| *C09D 5/02* | (2006.01) |
| *C09D 7/41* | (2018.01) |
| *C09D 7/62* | (2018.01) |
| *C09D 133/06* | (2006.01) |

(52) U.S. Cl.
CPC ................ *C09D 5/29* (2013.01); *C08K 3/22* (2013.01); *C08K 9/02* (2013.01); *C09D 5/028* (2013.01); *C09D 7/41* (2018.01); *C09D 7/62* (2018.01); *C09D 133/066* (2013.01); *C08K 2003/0812* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 2003/0176536 A1* | 9/2003 | Rathschlag | .......... C09D 17/004 |
| | | | 523/171 |
| 2011/0318570 A1 | 12/2011 | Ryuzaki et al. | |
| 2019/0001370 A1 | 1/2019 | Itoh et al. | |
| 2020/0283635 A1* | 9/2020 | Horiguchi | ............. C09C 1/0015 |
| 2023/0279242 A1 | 9/2023 | Yabushita et al. | |

FOREIGN PATENT DOCUMENTS

| | | |
|---|---|---|
| CN | 115803402 | 3/2023 |
| JP | 2002-224618 | 8/2002 |
| JP | 2010-209167 | 9/2010 |
| JP | 2011-131186 | 7/2011 |
| JP | 2012-46676 | 3/2012 |
| WO | 2017/135426 | 8/2017 |
| WO | 2021/235230 | 11/2021 |

OTHER PUBLICATIONS

Translation of International Search Report issued Feb. 27, 2024 in International (PCT) Application No. PCT/JP2023/044222.
Translation of Written Opinion of the International Searching Authority issued Feb. 27, 2024 in International (PCT) Application No. PCT/JP2023/044222.

* cited by examiner

*Primary Examiner* — Robert T Butcher
(74) *Attorney, Agent, or Firm* — WENDEROTH, LIND & PONACK, L.L.P.

(57) ABSTRACT

A coating composition including a coating film-forming resin and a pigment, wherein a chroma $C^*_{-15}$ in an $L^*C^*h$ color system based on a spectral reflectance of reflected light $R_{-15}$ having received, at an angle of $-15$ degrees with respect to specular light, incident light $I_{45}$ striking at an angle of 45 degrees with respect to a surface of a cured coating film of the coating composition and a chroma $C^*_{15}$ in an $L^*C^*h$ color system based on a spectral reflectance of reflected light $R_{15}$ having received the incident light $I_{45}$ at an angle of 15 degrees with respect to the specular light satisfy the relationships of:

$$C^*_{-15} > C^*_{15} > 10,$$

and $$C^*_{-15} - C^*_{15} > 20,$$

and wherein a chroma $C^*_{45}$ in an $L^*C^*h$ color system based on a spectral reflectance of reflected light $R_{45}$ having received the incident light $I_{45}$ at an angle of 45 degrees with respect to the specular light is 10 or less.

8 Claims, 1 Drawing Sheet

COATING COMPOSITION, COATED ARTICLE, AND METHOD FOR PRODUCING COATED ARTICLE

TECHNICAL FIELD

The present invention relates to a coating composition, a coated article, and a method for producing a coated article.

BACKGROUND ART

In recent years, designs required for coating films of automobiles and the like are diversified due to diversification of consumers' preferences and pursuit of originality. Accordingly, various coating compositions have been developed. For example, Patent Document 1 discloses a coating composition which can affords a coating film whose hue continuously changes by changing the observation angle from the face angle to the glazing angle, and which is achromatic at the face angle and chromatic at the glazing angle. On the contrary, Patent Document 2 discloses a coating composition capable of affording a coating film that is chromatic at a face angle and achromatic at a glazing angle.

PRIOR ART DOCUMENTS

Patent Documents

Patent Document 1: JP-A-2010-209167
Patent Document 2: JP-A-2012-046676

SUMMARY OF THE INVENTION

Problems to be Solved by the Invention

An object of the present invention is to provide a coating composition capable of affording a coating film that has a design different from those of Patent Documents 1 and 2, and that greatly changes in vividness in a highlight region and is observed as an achromatic color or a color close thereto in a face region.

Solutions to the Problems

In order to solve the above-described problems, the present invention provides the following embodiments.

[1]
A coating composition comprising a coating film-forming resin and a pigment,
wherein a chroma $C^*_{-15}$ in an L*C*h color system based on a spectral reflectance of reflected light $R_{-15}$ having received, at an angle of −15 degrees with respect to specular light, incident light $I_{45}$ striking at an angle of 45 degrees with respect to a surface of a cured coating film of the coating composition and a chroma $C^*15$ in an L*C*h color system based on a spectral reflectance of reflected light $R_{15}$ having received the incident light $I_{45}$ at an angle of 15 degrees with respect to the specular light satisfy relationships of:

$$C^*_{-15} > C^*_{15} > 10,$$

and $$C^*_{-15} - C^*_{15} > 20,$$

and a chroma $C^*_{45}$ in an L*C*h color system based on a spectral reflectance of reflected light $R_{45}$ having received the incident light $I_{45}$ at an angle of 45 degrees with respect to the specular light is 10 or less.

[2]
The coating composition according to the above [1], wherein the chroma $C^*_{15}$ is 50 or more.

[3]
The coating composition according to the above [1] or [2], wherein the chroma $C^*_{15}$ is more than 10 and 40 or less.

[4]
The coating composition according to any one of the above [1] to [3], wherein
a lightness $L^*_{-15}$ based on a spectral reflectance of the reflected light $R_{-15}$ and a lightness $L^*_{15}$ based on a spectral reflectance of the reflected light $R_{15}$ satisfy a relationship of $$L^*_{-15} - L^*_{15} \geq 10.$$

[5]
The coating composition according to any one of the above [1] to [4], wherein
in a wavelength region of 400 nm to 700 nm,
a maximum spectral reflectance $SR_{-15}$ of the reflected light $R_{-15}$ and a spectral reflectance $SR_{15}$ of the reflected light $R_{15}$ at a wavelength at which the spectral reflectance $SR_{-15}$ of the reflected light $R_{-15}$ is maximized satisfy a relationship of $$SR_{-15} - SR_{15} \geq 20\ (\%).$$

[6]
The coating composition according to any one of the above [1] to [5], wherein
in a wavelength region of 400 nm to 700 nm,
a wavelength $W_{-15}$ at which a spectral reflectance $SR_{-15}$ of the reflected light $R_{-15}$ is maximized and a wavelength $W_{15}$ at which a spectral reflectance $SR_{15}$ of the reflected light $R_{15}$ is maximized satisfy a relationship of $$|W_{-15} - W_{15}| \geq 40\,(\text{nm}).$$

[7]
The coating composition according to any one of the above [1] to [6], wherein
the pigment includes a light interference scaly pigment, and
the light interference scaly pigment includes:
a scaly reflective base having a first surface and a second surface opposite with the first surface;
a first layer containing at least one selected from the group consisting of silicon dioxide, aluminum oxide, and metal fluoride; and
a second layer containing at least one selected from the group consisting of chromium, aluminum, silver, nickel, palladium, platinum, titanium, vanadium, cobalt, iron, tin, tungsten, molybdenum, rhodium, niobium, copper, and gold,
and on each of the first surface and the second surface, at least two of the first layer and at least two of the second layer are alternately disposed with one of the first layers being as an innermost layer.

[8]

A coated article comprising:

an article to be coated; and a cured coating film of the coating composition according to any one of the above [1] to [7] provided on the article to be coated.

[9]

A method for producing a coated article, comprising applying the coating composition according to any one of the above [1] to [7] to an article to be coated, and then curing the coating composition.

Effects of the Invention

In accordance with the coating composition of the present invention, there is provided a coating composition capable of affording a coating film that greatly changes in vividness in a highlight region and is observed as an achromatic color or a color close thereto in a face region.

DETAILED DESCRIPTION

[Coating Composition]

The coating composition according to the present disclosure comprises a coating film-forming resin and a pigment.

The cured coating film of the coating composition according to the present disclosure has a chromatic color and greatly changes in vividness in a highlight region. That is, a chroma $C^*_{-15}$ in an L*C*h color system based on a spectral reflectance of reflected light $R_{-15}$ having received, at an angle of −15 degrees with respect to specular light, incident light $I_{45}$ striking at an angle of 45 degrees with respect to a surface of a cured coating film of the coating composition and a chroma $C^*_{15}$ in an L*C*h color system based on a spectral reflectance of reflected light $R_{15}$ having received the light $I_{45}$ at an angle of 15 degrees with respect to the specular light satisfy the relationships of:

$$C^*_{-15} > C^*_{15} > 10,$$

and $$C^*_{-15} - C^*_{15} > 20.$$

"$C^*_{-15} > C^*_{15} > 10$" indicates that both of the reflected lights $R_{-15}$ and $R_{15}$ have a chromatic color, and the reflected light $R_{-15}$ has higher chroma than the reflected light $R_{15}$. "$C^*_{-15} - C^*_{15} > 20$" indicates that the difference in chroma between the reflected light $R_{-15}$ and the reflected light $R_{15}$ is larger than 20.

Furthermore, the cured coating film of the coating composition according to the present disclosure (hereinafter, it may be simply referred to as a "cured coating film") is observed as an achromatic color or a color close thereto in a face region. Specifically, the chroma $C^*_{45}$ value in the L*C*h color system based on a spectral reflectance of reflected light $R_{45}$ having received the incident light $I_{45}$ at an angle of 45 degrees with respect to the specular light is 10 or less.

The cured coating film is achromatic when viewed from the normal direction thereof, but has an unprecedented design property that, when the viewing angle is gradually reduced, namely, when the cured coating film is observed while the viewing angle is changed such that the angle with respect to specular light decreases from the normal direction (in this case, a direction of 45 degrees with respect to the specular light) of the coating film, the chromatic color suddenly looks when a certain angle is reached.

A highlight region refers to a range of −25 degrees or more and less than 25 degrees with respect to specular light of light striking at an angle of 45 degrees. A shade region refers to a range of 75 degrees or more with respect to specular light of light striking at an angle of 45 degrees. The face region is a range between a highlight and a shade (greater than 25 degrees and less than 75 degrees with respect to specular light). In the present disclosure, as the highlight region, a region of −15 degrees to 15 degrees with respect to specular light, which can be called a super highlight region, is observed. In the present disclosure, as the face region, a point at 45 degrees with respect to specular light, which is equal to the normal direction of the cured coating film, is observed.

(Chroma $C^*_{-15}$, $C^*_{15}$, $C^*_{45}$)

The chroma $C^*_{-15}$ is a chroma in an L*C*h color system based on the spectral reflectance of reflected light $R_{-15}$ having received, at an angle of −15 degrees with respect to specular light, incident light $I_{45}$ striking at an angle of 45 degrees with respect to a surface of a cured coating film. Similarly, $C^*_{15}$ is a chroma in an L*C*h color system based on a spectral reflectance of reflected light $R_{15}$ having received, at an angle of 15 degrees with respect to specular light, incident light $I_{45}$ striking at an angle of 45 degrees with respect to a surface of a cured coating film. Similarly, $C^*_{45}$ is a chroma in an L*C*h color system based on a spectral reflectance of reflected light $R_{45}$ having received, at an angle of 45 degrees with respect to specular light, incident light $I_{45}$ striking at an angle of 45 degrees with respect to a surface of a cured coating film.

The chroma $C^*_{-15}$ is greater than 10. This ensures that the cured coating film is observed as a chromatic color in the highlight region. The chroma $C^*_{-15}$ is desirably as large as possible in that the change in vividness is likely to be large. The chroma $C^*_{-15}$ may be 50 or more, 55 or more, 60 or more, 65 or more, or 70 or more. The chroma $C^*_{-15}$ is 100 or less, may be 98 or less, and may be 95 or less.

The chroma $C^*_{15}$ is greater than 10. On the other hand, from the same point of view as described above, the chroma $C^*_{15}$ is desirably as small as possible. The chroma $C^*_{15}$ may be 40 or less, and may be 35 or less. The chroma $C^*_{15}$ may be 15 or more, or 20 or more.

$C^*_{-15} - C^*_{15}$ is more than 20, and may be 25 or more, may be 30 or more, and may be 35 or more. $C^*_{-15} - C^*_{15}$ may be 70 or less, may be 65 or less, and may be 60 or less.

The chroma $C^*_{-15}$ may be 60 or more, and the chroma $C^*_{15}$ may be more than 10 and 40 or less.

The chroma $C^*_{45}$ is 10 or less. It is desirable that the chroma $C^*_{45}$ is as small as possible in that the color becomes closer to an achromatic color. The chroma $C^*_{45}$ may be 9 or less, may be 8 or less, and may be 5 or less.

(Lightness $L^*_{-15}$, $L^*_{15}$)

The lightness $L^*_{-15}$ is a lightness in an L*C*h color system based on the spectral reflectance of the reflected light $R_{-15}$. Similarly, the lightness $L^*_{15}$ is a lightness in an $L^*C^*h$ color system based on a spectral reflectance of the reflected light $R_{15}$.

The lightness $L^*_{-15}$ and the lightness $L^*_{15}$ may satisfy the relationship of:

$$L^*_{-15} - L^*_{15} \geq 10.$$

In this case, the cured coating film can change in lightness as well as chroma in the highlight region. Accordingly, the design property is further improved.

$L^*_{-15}$-$L^*_{15}$ may be 15 or more, and may be 20 or more. $L^*_{-15}$-$L^*_{15}$ may be 45 or less, and may be 40 or less.

The lightness $L^*_{-15}$ is desirably as large as possible in that the change in lightness is likely to be large. The lightness $L^*_{-15}$ may be 35 or more, and may be 40 or more. When the lightness $L^*_{-15}$ is 35 or more, it is ensured that the cured coating film has a certain degree of brightness in the highlight region, and the design property is further improved. The lightness $L^*_{-15}$ may be 80 or less, and may be 75 or less.

The lightness $L^*_{15}$ is desirably as small as possible from the same point of view as described above. The lightness $L^*_{15}$ may be 50 or less, and may be 45 or less. The lightness $L^*_{15}$ may be 15 or more, and may be 20 or more.

(Spectral reflectance $SR_{-15}$, $SR_{15}$)

Spectral reflectance $SR_{-15}$ is the maximum spectral reflectance (%) of reflected light $R_{-15}$ in a wavelength region (visible light region) of 400 nm to 700 nm. The spectral reflectance $SR_{15}$ is a spectral reflectance of the reflected light $R_{15}$ at a wavelength at which the spectral reflectance $SR_{-15}$ of the reflected light $R_{-15}$ is maximized.

The spectral reflectance $SR_{-15}$ and the spectral reflectance $SR_{15}$ may satisfy the relationship of:

$$SR_{-15} - SR_{15} \geq 20\,(\%).$$

Also in this case, the cured coating film can change in lightness as well as chroma in the highlight region.

$SR_{-15}$-$SR_{15}$ may be 30% or more, and may be 35% or more. $SR_{-15}$-$SR_{15}$ may be 130% or less, and may be 120% or less.

$SR_{-15}$ may be, for example, 50% or more, may be 60% or more, and may be 65% or more. $SR_{-15}$ may be, for example, 180% or less, may be 170% or less, and may be 160% or less.

$SR_{15}$ may be, for example, 10% or more, may be 20% or more, and may be 25% or more. $SR_{15}$ may be, for example, 80% or less, may be 70% or less, and may be 60% or less.

(Wavelength $W_{-15}$, $W_{15}$)

The wavelength $W_{-15}$ is a wavelength W at which the spectral reflectance $SR_{-15}$ of the reflected light $R_{-15}$ is maximized in a wavelength of 400 nm to 700 nm. Similarly, the wavelength $W_{15}$ is a wavelength W at which the spectral reflectance $SR_{15}$ of the reflected light $R_{15}$ is maximized in a wavelength of 400 nm to 700 nm.

The wavelength $W_{-15}$ and the wavelength $W_{15}$ may satisfy the relationship of:

$$|W_{-15}\text{ value} - W_{15}\text{ value}| \geq 40\,(\text{nm}).$$

This means that the peak wavelength of the spectral reflectance of the reflected light $R_{-15}$ is greatly different from the peak wavelength of the spectral reflectance of the reflected light $R_{15}$. In this case, the cured coating film can change in hue itself in the highlight region.

$|W_{-15}$ value–the $W_{15}$ value| may be 43 nm or more, and may be 45 nm or more. $|W_{-15}$ value–the $W_{15}$ value| may be 80 nm or less, and may be 70 nm or less.

In the $L^*C^*h$ color system, $L^*$ denotes lightness, $C^*$ denotes chroma, and h denotes a hue angle. In the $L^*C^*h$ color system, the vividness of a substance to be measured increases as the numerical value of the chroma $C^*$ increases, whereas the dullness increases as the numerical value of the chroma $C^*$ decreases. In the $L^*C^*h$ color system, the brightness of a substance to be measured increases as the numerical value of the lightness $L^*$ increases, whereas the darkness increases as the numerical value of the lightness $L^*$ decreases.

The $L^*C^*h$ color system is calculated on the basis of the CIE $L^*a^*b$ color system (CIE 1976 $L^*a^*b^*$ color space). The CIE 1976 $L^*a^*b^*$ color space can be determined in accordance with JIS Z 8781-4. The CIE $L^*a^*b$ color system is a color system defined by the International Commission on Illumination and described in Section 4.2 of CIE Publication 15.2 (1986). The lightness $L^*_{15}$ and the lightness $L^*_{110}$ can be acquired using, for example, a multi-angle colorimeter (for example, trade name: BYK-maci, manufactured by BYK-Gardner).

Figure 1:
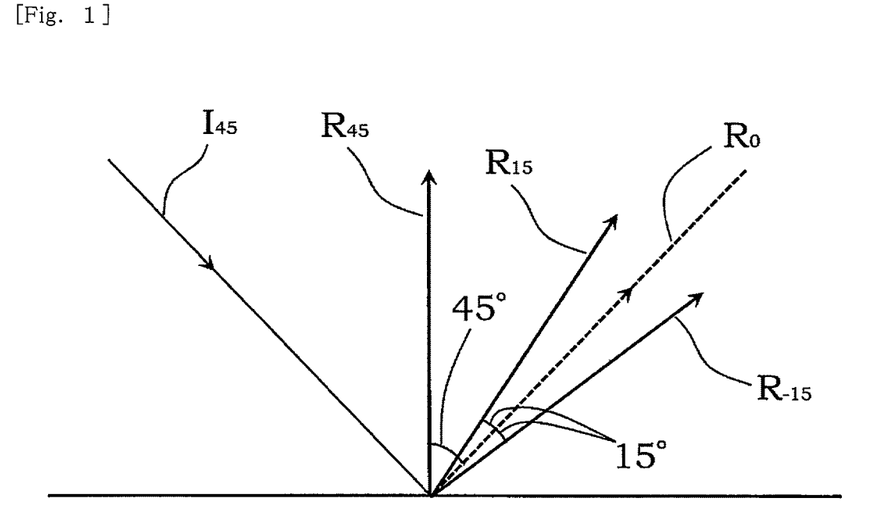
FIG. 1 is a diagram for explaining an angle of reflected light.

FIG. 1 is a diagram for explaining an angle of reflected light. The specular light of the incident light $I_{45}$ striking at an angle of 45 degrees with respect to a surface of a multilayer coating film is indicated by $R_0$. Reflected light received at an angle of −15 degrees with respect to the specular light of the incident light $I_{45}$ is indicated by $R_{-15}$. The chroma $C^*_{-15}$ and the lightness $L^*_{-15}$ are calculated from the spectral reflectance of the reflected light $R_{-15}$. Reflected light receiving at an angle of 15 degrees with respect to the specular light $R_0$ of the incident light $I_{45}$ is indicated by $R_{15}$. The chroma $C^*$is and the lightness $L^*_{15}$ are calculated from the spectral reflectance of the incident light $R_{15}$. Reflected light receiving at an angle of 45 degrees with respect to the specular light of the incident light $I_{45}$ is indicated by $R_{45}$. The lightness $L^*_{45}$ is calculated from the spectral reflectance of the reflected light $R_{45}$.

Figure 2:
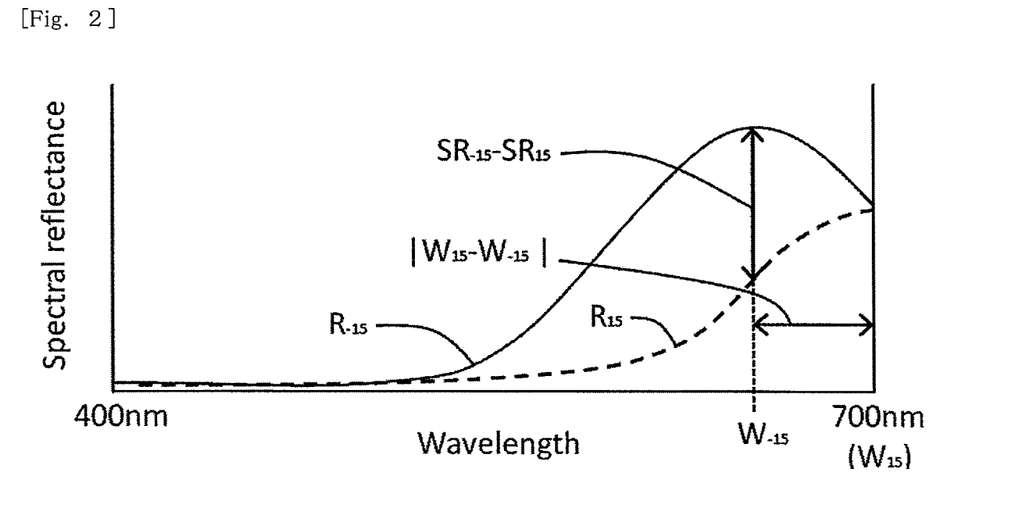
FIG. 2 is a graph schematically showing one example of a change in spectral reflectance of reflected lights $R_{-15}$ and $R_{15}$.

FIG. 2 is a graph schematically showing one example of a change in spectral reflectance of the reflected lights $R_{-15}$ and $R_{15}$. In the graph, the abscissa indicates wavelength, and the ordinate indicates spectral reflectance. In the graph, the peak value (maximum value) of the spectral reflectance of the reflected light $R_{15}$ is smaller than the peak value (maximum value) of the spectral reflectance of the reflected light $R_{-15}$, and the peak position is shifted to the longer wavelength side than the peak position of the reflected light $R_{-15}$.

In the graph, the reflected light $R_{-15}$ has a peak wavelength between more than 600 nm and 700 nm and exhibits a red color. However, the position of the peak wavelength of the reflected light $R_{-15}$ is not limited thereto, and is set to a desired wavelength range. The magnitude of the spectral reflectance at each wavelength is also not limited thereto. In the wavelength range shown in the graph of FIG. 2, each reflected light has only one peak, but may have two or more peaks.

(Pigment)

The coating composition may contain a light interference scaly pigment as a pigment. As a result, the change in vividness in the highlight region increases, and the chroma $C^*_{-15}$ value and the chroma $C^*_{15}$ value can easily satisfy the relationship provided above.

<<Light Interference Scaly Pigment>>

A light interference scaly pigment (hereinafter, it may be simply referred to as a "light interference pigment") includes a scaly reflective base having a first surface and a second surface opposite with the first surface, a first layer, and a second layer. On each of the first surface and the second surface, at least two of the first layer and at least two of the second layer are alternately disposed with one of the first layers being as an innermost layer. That is, the light interference pigment has at least four layers on each of both surfaces of the scaly reflective base. Specifically, the light interference pigment has a configuration of second layer/first layer/second layer/first layer/reflective base/first layer/second layer/first layer/second layer. Six or more layers may be provided on each of both surfaces of the reflective base.

The first layer contains at least one selected from the group consisting of silicon dioxide, aluminum oxide, and metal fluoride. Typically, such a first layer is transparent and has a low refractive index. Therefore, the strength of the light interference pigment can be increased or the thickness of the light interference pigment can be gained without significantly affecting the light transmissibility.

The second layer contains at least one selected from the group consisting of chromium, aluminum, silver, nickel, palladium, platinum, titanium, vanadium, cobalt, iron, tin, tungsten, molybdenum, rhodium, niobium, copper, and gold. Such a second layer adjusts light transmissibility to cause light interference.

Thanks to the configuration that on each of both surfaces of the reflective base, two or more first layers having a low refractive index and two or more second layers capable of causing light interference are alternately disposed, the coating film thickness of the reflective base increases, and light reflected by the reflective base is easily absorbed by these layers. Therefore, it is considered that the change in vividness in the highlight region of the cured coating film increases.

The scaly form refers to a form having an aspect ratio (average major diameter of the pigment/average thickness of the pigment) of more than 1.0. The aspect ratio of the scaly pigment may be, for example, 20 or more and 300 or less. The aspect ratio of the scaly pigment may be 30 or more. The aspect ratio of the scaly pigment may be 200 or less.

The average thickness of the light interference pigment is obtained by observing a section of a cured coating film containing the light interference pigment using a transmission electron microscope (TEM), and averaging the thicknesses of arbitrarily selected 100 light interference pigments.

The average thickness of the light interference pigment is, for example, 0.01 μm or more and 1.2 μm or less. The average thickness of the light interference pigment may be 0.04 μm or more. The average thickness of the light interference pigment may be 1.1 μm or less.

The average major diameter of the light interference pigment is synonymous with the average particle size D50. The average particle size D50 of the light interference pigment may be, for example, 10 μm or more and 100 μm or less. The lower limit of the average particle size D50 of the light interference pigment may be 15 μm, 20 μm, 25 μm, or 30 μm. The upper limit of the average particle size D50 of the light interference pigment may be 90 μm, 80 μm, 70 μm, or 60 μm.

The average particle size D50 of the light interference pigment can be determined by measuring the maximum lengths of arbitrarily selected 30 light interference pigments using a 3D laser scanning confocal microscope (for example, VK-X250 manufactured by Keyence Corporation) and calculating the average value of the measurements.

The reflective base has a spectral reflectance of 5% or more and 100% or less in a wavelength range of 400 nm to 700 nm. The reflective base may be formed of a metal, a metal compound, an alloy, a non-metal, or a combination thereof. Among them, the reflective base may be a metal, a metal compound, an alloy, or a combination thereof. Examples of the metal and the alloy include aluminum, copper, silver, gold, platinum, titanium, palladium, nickel, cobalt, niobium, chromium, tin, alloys thereof, and combinations thereof. Examples of the metal compound include carbides, oxides, nitrides, and sulfides of the above metals, and combinations thereof. Among them, the reflective base may be aluminum.

The thickness of the reflective base may be, for example, 5 nm or more and 1200 nm or less. The lower limit of the thickness of the reflective base may be 10 nm, 15 nm, 20 nm, 25 nm, 30 nm, 40 nm, 50 nm, 60 nm, or 70 nm. The upper limit of the thickness of the reflective base may be 1200 nm, 1100 nm, 1000 nm, 900 nm, 800 nm, 700 nm, 600 nm, or 500 nm.

The first layer has, for example, a refractive index of less than 1.65. The first layer may particularly contain magnesium fluoride. The thickness of the first layer is appropriately set according to a desired refractive index. The thickness of the first layer may be, for example, 100 nm or more and 1000 nm or less. The thickness of the first layer may be 500 nm or less, may be 300 nm or less, and may be 250 nm or less.

The second layer may be translucent, and may be opaque. The second layer may contain chromium or nickel, and particularly may contain chromium. The metal may be contained in the second layer as a mixture with an alloy, a metal compound, or another substance. Examples of the other material include, for example, carbon, graphite, silicon, germanium, cermet, ferric oxide or other metal oxides, and dielectric matrices. Examples of the alloy include Inconel (Ni-Cr-Fe), stainless steel, and Hastelloy (Ni-Mo-Fe; Ni-Mo-Fe-Cr; Ni-Si-Cu), various titanium alloys, and cobalt-nickel alloys. Examples of the mixture include Ti/C, Ti/W, Ti/Nb, and Ti/Si. Examples of the metal compound include titanium silicide ($TiSi_2$) and titanium boride ($TiB_2$).

The thickness of the second layer is appropriately set according to desired light interference property. The thickness of the second layer may be, for example, 1 nm or more and 50 nm or less. The thickness of the second layer may be 5 nm or more. The thickness of the second layer may be 10 nm or less.

In one embodiment, the light interference pigment has a configuration of Cr (second layer)/$MgF_2$ (first layer)/Cr (second layer)/$MgF_2$ (first layer)/Al (base)/$MgF_2$ (first layer)/Cr (second layer)/$MgF_2$ (first layer)/Cr (second layer).

The components contained in the plurality of first layers may be either the same or different. The thicknesses of the plurality of first layers may be the same or different. The components contained in the plurality of second layers may be either the same or different. The thicknesses of the plurality of second layers may be the same or different.

The light interference pigment may be colored. The coloring material is not particularly limited and can be appropriately selected as long as the effect of the light interference pigment is not impaired.

As the light interference pigment, a commercially available product may be used. As the light interference pigment, for example, the CHROMAFLAIR (trademark) series manufactured by VIAVI Solutions Inc. can be used.

The content of the light interference pigment, that is, the mass ratio (PWC) of the light interference pigment to the solid content of the resin contained in the coating composition is, for example, 1% by mass or more and 50% by mass or less. The PWC of the light interference pigment may be 5% by mass or more, and may be 8% by mass or more. The PWC of the light interference pigment may be 40% by mass or less, and may be 35% by mass or less. The solid content of the resin is a solid content of all resin components such as a coating film-forming resin and a curing agent described later.

<<Other Pigments>>

The coating composition may contain a pigment other than the light interference pigment. Examples of the other pigment include coloring pigments, extender pigments, rust-proof pigments, light interference pigments other than the light interference pigment described above, and glitters. The mass ratio (PWC) of the other pigment is not particularly limited as long as the effect of the coating composition according to the present disclosure is not impaired. The mass ratio (PWC) of the other pigment may be 15% by mass or less, may be 13% by mass or less, and may be 10% by mass or less.

The coloring pigment may be an inorganic substance or an organic substance. The coloring pigment may have either a chromatic color or an achromatic color. Examples of the organic coloring pigment include azo-chelate-based pigments, insoluble azo-based pigments, condensed azo-based pigments, diketopyrrolopyrrole-based pigments, phthalocyanine-based pigments, indigo pigments, perinone-based pigments, perylene-based pigments, dioxane-based pigments, quinacridone-based pigments, isoindolinone-based pigments, and metal complex pigments. Examples of the inorganic coloring pigment include chrome yellow, yellow iron oxide, red iron oxide, carbon black, and titanium dioxide. These are used singly or two or more of them are used in combination.

Examples of the extender pigment include calcium carbonate, barium sulfate, clay, and talc. These are used singly or two or more of them are used in combination.

Examples of the other light interference pigment and the glitter include mica pigments such as interference mica, white mica and colored mica; graphite pigments; glass flake pigments; and metal pigments such as aluminum, copper, zinc, iron, nickel, tin, aluminum oxide, chromium oxide, and alloys containing these. These are used singly or two or more of them are used in combination. The other light interference pigment and the glitter may be colored.

(Coating Film-Forming Resin)

Examples of the coating film-forming resin include an acrylic resin, an acrylic silicone resin, a polyester resin, a polyurethane resin, an epoxy resin, a fluororesin, and a silicone resin. These are used singly or two or more of them are used in combination. Among them, an acrylic resin may be used.

In a water-borne coating composition, these resins may be contained in the form of an emulsion, may be contained in the form of a dispersion, and may be contained in a state of being dissolved in a solvent.

For example, an acrylic resin emulsion can be prepared by emulsion polymerization of an α,β-ethylenically unsaturated monomer. Examples of the α,β-ethylenically unsaturated monomer include a (meth)acrylic acid ester, an α,β-ethylenically unsaturated monomer having an acid group, and an α,β-ethylenically unsaturated monomer having a hydroxy group. Such monomers are used singly or two or more of them are used in combination.

Examples of the (meth)acrylic acid ester include methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, lauryl methacrylate, phenyl (meth)acrylate, isobornyl (meth)acrylate, cyclohexyl (meth)acrylate, t-butylcyclohexyl (meth)acrylate, dicyclopentadienyl (meth)acrylate, and dihydrodicyclopentadienyl (meth)acrylate). The (meth)acrylic acid ester represents an acrylic acid ester and a methacrylic acid ester.

Examples of the α,β-ethylenically unsaturated monomer having an acid group include acrylic acid, methacrylic acid, crotonic acid, 2-acryloyloxyethylphthalic acid, 2-acryloyloxyethylsuccinic acid, ω-carboxy-polycaprolactone mono (meth)acrylate, isocrotonic acid, α-hydro-ω-((1-oxo-2-propenyl)oxy) poly(oxy(1-oxo-1,6-hexanediyl)), maleic acid, fumaric acid, itaconic acid, 3-vinylsalicylic acid, 3-vinylacetylsalicylic acid, 2-acrylamido-2-methylpropanesulfonic acid, p-hydroxystyrene, and 2,4-dihydroxy-4'-vinylbenzophenone.

Examples of the α,β-ethylenically unsaturated monomer having a hydroxy group include hydroxyethyl (meth)acrylate, hydroxypropyl (meth)acrylate, hydroxybutyl (meth)acrylate, allyl alcohol, methallyl alcohol, and adducts of these with ε-caprolactone.

Another α,β-ethylenically unsaturated monomer may be used in combination. Examples of the other α,β-ethylenically unsaturated monomer include a polymerizable amide compound, a polymerizable aromatic compound, a polymerizable nitrile, a polymerizable alkylene oxide compound, a polyfunctional vinyl compound, a polymerizable amine compound, an α-olefin, a diene, a polymerizable carbonyl compound, a polymerizable alkoxysilyl compound, and other polymerizable compounds.

The method of emulsion polymerization is not particularly limited. For example, an emulsifier is dissolved in water or an aqueous medium containing an organic solvent such as an alcohol, an ether (for example, dipropylene glycol methyl ether or propylene glycol methyl ether) as necessary, and an α,β-ethylenically unsaturated monomer and a polymerization initiator are added dropwise under heating and stirring. The α,β-ethylenically unsaturated monomer may be emulsified in advance with an emulsifier.

As the polymerization initiator and the emulsifier, those commonly used by those skilled in the art can be used. As necessary, the molecular weight may be adjusted using a chain transfer agent such as a mercaptan (for example, lauryl mercaptan) or α-methylstyrene dimer. The reaction temperature, the reaction time, and so on may be appropriately selected within ranges commonly used by those skilled in the art. The acrylic resin emulsion obtained is neutralized with a base, as necessary.

The acrylic resin (emulsion of acrylic resin) obtained by emulsion polymerization may have a number average molecular weight of 3,000 or more. The acrylic resin may have a hydroxyl value (solid hydroxyl value) of 20 mg KOH/g or more and 180 mg KOH/g or less. The acrylic resin may have an acid value (solid acid value) of 1 mg KOH/g or more and 80 mg KOH/g or less.

The number average molecular weight is determined in a GPC method using polystyrene as a standard. The acid value and the hydroxyl value are calculated from the monomer composition used for the preparation, on the basis of the JIS regulation.

The acrylic resin dispersion can be prepared, for example, by solution-polymerizing the α,β-ethylenically unsaturated monomer and dispersing the resultant using a basic compound.

A water-soluble acrylic resin can be prepared, for example, by solution-polymerizing the α,β-ethylenically unsaturated monomer described above and solubilizing the resultant in water using a basic compound.

An acrylic resin to be blended in a solvent-based coating composition can be prepared, for example, by solution-polymerizing an α,β-ethylenically unsaturated monomer. The acrylic resin has a number average molecular weight of, for example, 1,000 or more and 20,000 or less. The acrylic resin may have an acid value (solid acid value) of 1 mg KOH/g or more and 80 mg KOH/g or less. The acrylic resin may have a hydroxyl value (solid hydroxyl value) of 101 mg KOH/g or more and 200 mg KOH/g or less.

(Curing Agent)

The coating composition may contain a curing agent. The curing agent reacts with the coating film-forming resin to form a cured coating film together with the coating film-forming resin.

Examples of the curing agent include a melamine resin, a blocked isocyanate compound, an epoxy compound, an aziridine compound, a carbodiimide compound, an oxazoline compound, and a metal ion. These are used singly or two or more of them are used in combination. Among them, at least one of the melamine resin and the blocked isocyanate compound may be used.

The melamine resin may be either soluble in water or insoluble in water. The melamine resin has a structure in which a hydrogen atom or a substituent (alkyl ether group, methylol group, or the like) is bonded around a melamine nucleus (triazine nucleus) with three nitrogen atoms interposed therebetween. The melamine resin is generally composed of a polynuclear body in which a plurality of melamine nuclei is bonded together. Alternatively, the melamine resin may be a mononuclear body composed of a single melamine nucleus.

A commercially available melamine resin may be used. Examples of a commercially available melamine resin include the CYMEL series (trade name) manufactured by Allnex GMBH, specifically, CYMEL 202, CYMEL 204, CYMEL 211, CYMEL 232, CYMEL 235, CYMEL 216, CYMEL 238, CYMEL 250, CYMEL 251, CYMEL 254, CYMEL 266, CYMEL 267, CYMEL 272, CYMEL 285, CYMEL 301, CYMEL 303, CYMEL 325, CYMEL 327, CYMEL 350, CYMEL 370, CYMEL 701, CYMEL 703, CYMEL 1141; and the U-VAN (trade name) series manufactured by Mitsui Chemicals, Inc. These are used singly or two or more of them are used in combination.

The blocked isocyanate compound can be prepared by adding a blocking agent having an active hydrogen to polyisocyanate such as trimethylene diisocyanate, hexamethylene diisocyanate, xylylene diisocyanate, and isophorone diisocyanate.

The content of the curing agent may be 10% by mass or more and 80% by mass or less of the resin solid content contained in the coating composition. The content of the curing agent may be 15% by mass or more. The content of the curing agent may be 60% by mass or less.

(Phosphoric Acid Group-Containing Organic Compound)

The coating composition may further contain a phosphoric acid group-containing organic compound. The phosphoric acid group-containing compound makes the dispersibility of the light interference pigment to be easily improved.

The content of the phosphoric acid group-containing compound may be 0.1% by mass or more and 15% by mass or less of the entire solid content of the coating composition. The content of the phosphoric acid group-containing compound may be 1% by mass or more. The content of the phosphoric acid group-containing compound may be 12% by mass or less.

The phosphoric acid group-containing compound is not particularly limited as long as it has a phosphoric acid group ($-P(=O)(OR)_2$ (R is each independently hydrogen or a hydrocarbon group). The phosphoric acid group-containing compound is, for example, at least one of an alkyl phosphate having an alkyl group having 4 to 30 carbon atoms and a phosphoric acid group-containing polymer having a phosphoric acid group value of 5 mg KOH/g or more and 300 mg KOH/g or less.

<Alkyl Phosphate Ester>

The alkyl phosphate has an alkyl group having 4 to 30 carbon atoms. Examples of the alkyl phosphate include a monoalkyl phosphate, a dialkyl phosphate, and mixtures thereof. In the dialkyl phosphate, the two alkyl groups may be the same or different. The dialkyl phosphate preferably has the same two alkyl groups.

Examples of the alkyl group having 4 to 30 carbon atoms include a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a docosyl group, a tetracosyl group, a hexacosyl group, and an octacosyl group. The alkyl group may be linear or branched.

Examples of the alkyl phosphate include butyl acid phosphate (a mixture of monobutyl phosphate and dibutyl phosphate), 2-ethylhexyl acid phosphate (a mixture of mono-2-ethylhexyl phosphate and di-2-ethylhexyl phosphate), isodecyl acid phosphate (a mixture of monoisodecyl phosphate and diisodecyl phosphate), dilauryl acid phosphate, lauryl acid phosphate (a mixture of monolauryl phosphate and dilauryl phosphate), tridecyl acid phosphate (a mixture of monotridecyl phosphate and ditridecyl phosphate), monostearyl acid phosphate, distearyl acid phosphate, and stearyl acid phosphate (a mixture of monostearyl phosphate and distearyl phosphate), isostearyl acid phosphate (a mixture of monoisostearyl phosphate and diisostearyl phosphate), oleyl acid phosphate (a mixture of monooleyl phosphate and dioleyl phosphate), and behenyl acid phosphate (a mixture of monobehenyl phosphate and dibehenyl phosphate).

<Phosphoric Acid Group-Containing Polymer>

The phosphoric acid group-containing polymer has a phosphoric acid group value of 5 mg KOH/g or more and 300 mg KOH/g or less. The phosphoric acid group value of the phosphoric acid group-containing polymer may be 10 mg KOH/g or more, and may be 50 mg KOH/g or more. The phosphoric acid group value of the phosphoric acid group-containing polymer may be 250 mg KOH/g or less, and may be 150 mg KOH/g or less.

The phosphoric acid group value is calculated on the basis of JIS K 5601 2-1 Acid value measurement method. Specifically, the acid value is the number of mg of potassium hydroxide (KOH) required to neutralize the free acid in 1 g of the non-volatile of the product.

The number average molecular weight of the phosphoric acid group-containing polymer is, for example, 1,000 or more and 50,000 or less. The number average molecular weight of the phosphoric acid group-containing polymer may be 3,000 or more and 5,000 or more. The number average molecular weight of the phosphoric acid group-containing polymer may be 30,000 or less, and may be 20,000 or less.

Examples of the phosphoric acid group-containing polymer include an acrylic resin, a polyester resin, a polyether resin, and an epoxy resin having a phosphoric acid group value of 5 mg KOH/g or more and 300 mg KOH/g or less. These are used singly or two or more of them are used in combination. Among them, the phosphoric acid group-containing polymer may be a phosphoric acid group-containing acrylic resin. The phosphoric acid group-containing acrylic resin is obtained, for example, by polymerizing a phosphoric acid group-containing α,β-ethylenically unsaturated monomer or copolymerizing this monomer with another α,β-ethylenically unsaturated monomer free from a phosphoric acid group. In particular, use of the light interference pigment and the phosphoric acid group-containing acrylic resin in combination makes the vividness of color in a highlight region to be more likely to change.

(Additive)

The coating composition may contain an additive commonly used by those skilled in the art. Examples of the additive include a surface conditioning agent, a viscosity controlling agent, a thickening agent, an ultraviolet blocking agent, and an antifoaming agent, and.

[Coated Article]

A coated article according to the present disclosure includes an article to be coated and an above-described cured coating film provided on the article to be coated. The coated article including the cured coating film is observed to have a great change in vividness in a highlight region and have an achromatic color or a color close thereto in a face region. Therefore, the coated article has an unprecedented design property that, when the coated article is viewed from the normal direction of the cured coating film, the coated article has an achromatic color, but when the viewing angle is gradually reduced, the chromatic color suddenly looks when the viewing angle exceeds a certain angle.

First Embodiment

In a first embodiment, a coated article includes an article to be coated, an above-described cured coating film (hereinafter, the coating film may be referred to as a "base coating film") provided on the article to be coated, and a clear coating film provided on the base coating film.

(Article to be Coated)

Examples of the material of the article to be coated include metal, plastic, and foam. In particular, the metal may be a metal (especially, a cast) and may be a metal capable of being coated by electrodeposition. Examples of such metal include metals such as iron, copper, aluminum, tin, and zinc, and alloys containing such metals.

The form of the article to be coated is not particularly limited, and may be a flat plate form and may be three-dimensionally molded. Examples of the article to be coated specifically include bodies of automobile such as passenger cars, trucks, motorcycles, and buses, and parts of automobile bodies.

The metallic article to be coated may have been subjected to chemical conversion treatment using a phosphoric acid-based chemical conversion treatment agent, a zirconium-based chemical conversion treatment agent, or the like, and electrodeposition coating. The electrodeposition coating composition may be either of a cationic type or of an anionic type. The cationic electrodeposition coating composition can form a coating film superior in anticorrosion property.

The metallic article to be coated may include an electrodeposition coating film and an intermediate coating film provided thereon. The intermediate coating film is usually provided for the purpose of improving the adhesion and durability of a multilayer coating film. The intermediate coating composition may include, for example, a coating film-forming resin, a curing agent, a coloring pigment, and an extender pigment. Examples of the coating film-forming resin and the curing agent include those the same as those contained in the coating composition according to the present disclosure.

(Base Coating Film)

The base coating film is formed from the coating composition according to the present disclosure (hereinafter, the coating composition may be referred to as a "base coating composition"). The thickness of the base coating film may be 0.2 μm or more and 50 μm or less. The thickness of the base coating film may be 3 μm or more. The thickness of the base coating film may be 40 μm or less, may be 30 μm or less, and may be 20 μm or less.

(Clear Coating Film)

The clear coating film protects the base coating film. The thickness of the clear coating film may be, for example, 10 μm or more and 80 μm or less. The thickness of the clear coating film may be 20 μm or more. The thickness of the clear coating film may be 60 μm or less.

The clear coating film is formed from a clear coating composition. The clear coating composition may be a solvent-based composition, may be a water-borne composition, and may be a powder type composition. In view of transparency, resistance to acid etching, and so on, the solvent-based clear coating composition may include an acrylic resin and/or a polyester resin as a coating film-forming resin and an amino resin and/or an isocyanate as a curing agent. The solvent-based clear coating composition may also include an acrylic resin and/or a polyester resin having a carboxylic acid and/or an epoxy group.

The clear coating composition may contain the above-described various pigments as long as the transparency and the effects of the coating composition according to the present disclosure are not impaired. The clear coating composition may comprise various additives, as necessary. Examples of the additive include an ultraviolet absorber, an antioxidant, an antifoaming agent, a surface conditioning agent, and a pinhole inhibitor.

Second Embodiment

In a second embodiment, a coated article includes an article to be coated, another cured coating film (hereinafter, this cured coating film is referred to as a "first base coating film") provided on the article to be coated, a cured coating film formed from a coating composition according to the present disclosure and provided on the first base coating film (hereinafter, this cured coating film is referred to as a "second base coating film"), and a clear coating film provided on the second base coating film. The article to be coated and the clear coating film are the same as those in the first embodiment. The second base coating film is formed from the coating composition according to the present disclosure, and is the same as the base coating film of the first embodiment. The first base coating film is described below.

(First Base Coating Film)

The first base coating film is formed from the first base coating composition. The first base coating composition may include a first coating film-forming resin and a pigment other than the above-described light interference pigment.

Examples of the first coating film-forming resin include those the same as the coating film-forming resins to be used for the coating composition according to the present disclosure. Both may be of either the same type or different types. As the pigment, any pigment other than the above-described light interference pigment can be used without any particular limitations. In addition, the first base coating composition may contain the same components as those of the coating composition according to the present disclosure.

The thickness of the first base coating film may be, for example, 0.2 μm or more and 20 μm or less. The thickness of the first base coating film may be 5 μm or more. The thickness of the first base coating film may be 15 μm or less, and may be 10 μm or less.

[Method for Producing Coated Article]

The method for producing a coated article according to the present disclosure includes applying the coating composition according to the present disclosure to an article to be coated and then curing the coating composition. Thus, the coated article is obtained.

The coated article according to the first embodiment further including a clear coating film is obtained by sequentially applying the coating composition according to the present disclosure (base coating composition) and a clear coating composition to an article to be coated, and then simultaneously curing both the compositions.

The coated article according to the second embodiment further including the first base coating film and a clear coating film is obtained by sequentially applying the first base coating composition and the coating composition according to the present disclosure (second base coating composition) to an article to be coated, then simultaneously curing both the compositions, and then applying and curing a clear coating composition.

The coated article according to the second embodiment may also be obtained by sequentially applying the first base coating composition, the coating composition according to the present disclosure (hereinafter, this coating composition may be referred to as a "second base coating composition"), and the clear coating composition, and then simultaneously curing them.

After the application of the first base coating composition, preheating may be performed before the coating composition according to the present disclosure (second base coating composition) is applied. After the coating composition according to the present disclosure is applied, preheating may be performed before the clear coating composition is applied.

Examples of an application method include multistage application, preferably two-stage application, using air-spray application, airless-spray application, electrostatic spray application, or air-electrostatic spray application, or application combining air-electrostatic spray application and a rotary atomization type electrostatic applicator.

Curing of each coating composition is performed, for example, under conditions of a heating temperature of 80° C. to 180° C. (preferably 100° C. to 160° C.) and a heating time of 5 minutes to 60 minutes (preferably 10 minutes to 30 minutes).

EXAMPLES

The present invention will be described hereafter in more detail by way of examples, to which the present invention is not intended to be limited. In the following examples, all designations of "part(s)" and "%" are on a mass basis, unless otherwise stated.

[Production Example 1] Production of Acrylic Resin Emulsion (Coating Film-Forming Resin)

633 parts of deionized water was added to a reaction vessel, and was heated to 80° C. while being mixed and stirred in a nitrogen stream. Subsequently, a first stage monomer mixture composed of 75.65 parts by mass of styrene (ST), 178.96 parts by mass of methyl methacrylate (MMA), 75.94 parts by mass of n-butyl acrylate (BA), 64.45 parts by mass of 2-ethylhexyl acrylate (2-EHA), and 105.00 parts by mass of hydroxyethyl methacrylate (HEMA), a monomer emulsion composed of 25.00 parts of Aqualon HS-10 (polyoxyethylene alkylpropenylphenyl ether sulfate, produced by DKS Co. Ltd.), 25.00 parts by mass of ADEKA REASOAP NE-20 (α-[1-[(allyloxy)methyl]-2-(nonylphenoxy)ethyl]-ο-hydroxyoxyethylene, produced by ADEKA Corporation), and 400 parts by mass of deionized water, and an initiator solution composed of 1.2 parts of ammonium persulfate and 500 parts of deionized water were dropped in parallel into the reaction vessel over 1.5 hours. After the completion of the dropping, aging was carried out at the same temperature for 1 hour.

Further, at 80° C., a second stage monomer mixture composed of 53.65 parts by mass of styrene (ST), 178.96 parts by mass of methyl methacrylate (MMA), 75.94 parts by mass of n-butyl acrylate (BA), 64.45 parts by mass of 2-ethylhexyl acrylate (2-EHA), 105.00 parts by mass of hydroxyethyl methacrylate (HEMA), and 22 parts by mass of acrylic acid, a monomer emulsion composed of 10 parts of Aqualon HS-10 and 250 parts of deionized water, and an initiator solution composed of 3.0 parts of ammonium persulfate and 500 parts of deionized water were dropped in parallel into the reaction vessel over 1.5 hours. After the completion of the dropping, aging was carried out at that temperature for 2 hours.

Subsequently, the mixture was cooled to 40° C. and filtered through a 400 mesh filter, and then 100 parts of deionized water and 1.6 parts of dimethylaminoethanol were added to adjust to pH 6.5, and thus an acrylic resin emulsion having an average particle size of 150 nm, a nonvolatile content of 35%, a solid acid value of 20 mg KOH/g, and a hydroxyl value of 100 mg KOH/g was obtained.

[Production Example 2] Production of Phosphoric Acid Group-Containing Organic Compound In a 1-liter reaction vessel equipped with a stirrer, a thermostat, and a cooling tube, 40 parts by mass of ethoxypropanol was charged, into which 121.7 parts of a monomer solution composed of 4 parts of styrene, 35.96 parts of n-butyl acrylate, 18.45 parts of ethylhexyl methacrylate, 13.92 parts of 2-hydroxyethyl methacrylate, 7.67 parts of methacrylic acid, and 40 parts of a solution obtained by dissolving 20 parts of Phosmer PP (acid phosphooxyhexa (oxypropylene) monomethacrylate manufactured by Uni-Chemical Co., Ltd.) in 20 parts of ethoxypropanol, and 1.7 parts of azobisisobutyronitrile was dropped at 120° C. over 3 hours, followed by continuous stirring for 1 hour. The obtained phosphoric acid group-containing organic compound had an acid value of 105 mg KOH/g, including a phosphoric acid group value of 55 mg KOH/g, a hydroxyl value of 60 mg KOH/g, a number average molecular weight of 6000, and a nonvolatile content of 63%.

In Examples of the present description, the measurement of the number average molecular weight was performed using "HLC8220GPC" (trade name, manufactured by Tosoh Corporation) as a GPC device and four columns "Shodex KF-606M" and "Shodex KF-603" (both products are manufactured by Showa Denko K.K., trade names) under the conditions of a mobile phase: tetrahydrofuran, a measurement temperature: 40° C., a flow rate: 0.6 cc/min, and a detector: RI.

In Examples of the present description, the acid value and the phosphoric acid group value of a phosphoric acid group-containing organic compound were determined by performing calculation based on the definition of acid value of provided in JIS K 5601 2-1 (the number of milligrams of potassium hydroxide (KOH) required to neutralize free acid in 1 g of sample (non-volatile)). The hydroxyl value was determined by performing calculation based on the definition of hydroxyl value provided in JIS K0070 (the number of milligrams of potassium hydroxide required to neutralize acetic acid bonded to a hydroxy group when 1 g of sample is acetylated).

[Production Example 3] Production of Water-Soluble Acrylic Resin 23.89 parts of tripropylene glycol methyl ether and 16.11 parts of propylene glycol methyl ether were added to a reaction vessel, and the temperature was raised to 105° C. while mixing and stirring in a nitrogen stream. Subsequently, a monomer mixture of 13.1 parts of methyl methacrylate, 68.4 parts of ethyl acrylate, 11.6 parts of 2-hydroxyethyl methacrylate, and 6.9 parts of methacrylic acid was prepared, and 100 parts of the monomer mixture and an initiator solution composed of 10.0 parts of tripropylene glycol methyl ether and 1 part of tert-butyl peroxy-2-ethylhexanoate were dropped in parallel into the reaction vessel over 3 hours. After the completion of the dropping, aging was carried out at that temperature for 0.5 hours.

Furthermore, an initiator solution composed of 5.0 parts of tripropylene glycol methyl ether and 0.3 parts of tert-butyl peroxy-2-ethylhexanoate was dropped into the reaction vessel over 0.5 hours. After the completion of the dropping, aging was carried out at that temperature for 2 hours.

After removing 16.1 parts of the solvent at 110° C. under reduced pressure (70 torr) with a desolvating apparatus, 204 parts of deionized water and 7.1 parts of dimethylaminoethanol were added to obtain a water-soluble acrylic resin solution. The water-soluble acrylic resin solution obtained had a nonvolatile content of 30%, a solid acid value of 40 mg KOH/g, a hydroxyl value of 50 mg KOH/g, and a viscosity of 140 poise (E-type viscometer, 1 rpm/25° C.).

The details of the pigments, etc. used in Examples and Comparative Examples are shown in Table 1.

TABLE 1

| | | | |
|---|---|---|---|
| Light interference pigment | | Second layer/first layer/second layer/first layer/reflective base/first layer/second layer/first layer/second layer (Reflective base: aluminum, first layer: magnesium fluoride, second layer: chromium) | Manufactured by VIAVI Solutions Inc., average particle size: 40 μm |
| Other light interference pigments | 1 | Second layer/first layer/reflective base/first layer/second layer (Reflective base: aluminum, first layer: magnesium fluoride, second layer: chromium) | Manufactured by VIAVI Solutions Inc., average particle size: 35 μm |
| | 2 | Titanium dioxide-coated silica flake (One titanium dioxide layer is disposed on each side of silica flake.) | Manufactured by Merck, average particle size: 43 μm |
| | 3 | Titanium dioxide-coated mica flake (One titanium dioxide layer is disposed on each side of mica flake.) | Manufactured by Merck, average particle size: 25 μm |
| | 4 | Titanium dioxide-coated glass flake (One titanium dioxide layer is disposed on each side of glass flake.) | Manufactured by Nippon Sheet Glass Co., Ltd., average particle size: 20 μm |
| Glitter | | Aluminum flake | Aluminum paste WL-4690, pulverized aluminum glitter, manufactured by Toyo Aluminium K.K., active ingredient: 60% |
| Coloring pigment | 1 | Perylene red | PALIOGEN RED L-3875: manufactured by BASF SE |
| | 2 | Anchor red | Iron oxide red pigment, manufactured by LANXESS |
| | 3 | Carbon black | Raven 5000 Ultra 3 POWDER, manufactured by Birla Carbon |
| | 4 | Titanium oxide | TIPAQUE CR-97, manufactured by Ishihara Sangyo Kaisha, Ltd. |
| | 5 | Hostaperm Violet | Hostaperm Violet RL NFVP336, manufactured by Clariant |
| | 6 | Cyanine Blue | G314 (CYANINE BLUE G-314R, manufactured by Sanyo Color Works, Ltd.) |
| Pigment dispersant | | DISPEX ULTRA PA 4550 | Modified polyacrylate-based pigment dispersant, manufactured by BASF SE |
| Surfactant | | NOIGEN EA-207D | Amphipathic compound, manufactured by DKS Co. Ltd., number average molecular weight: 4200, solid content: 55% |
| Curing agent | | CYMEL 370N | Mixed alkylated melamine resin, manufactured by Allnex GMBH, solid content: 87% |
| Antifoaming agent | | BYK-011 | Antifoaming agent manufactured by BYK-Chemie GmbH |

Example 1

(1) Preparation of Base Coating Composition (1-1) Preparation of Coloring Pigment Dispersion 1

34.5 parts of the water-soluble acrylic resin solution obtained in Production Example 3, 10.4 parts of carbon black (coloring pigment), 18.6 parts of a pigment dispersant, 36.0 parts of ion-exchanged water, and 0.5 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 1.

(1-2) Preparation of Base Coating Composition 133.3 parts of the acrylic resin emulsion of Production Example 1, 9.0 parts of dimethylaminoethanol, 35.6 parts of CYMEL 370N (curing agent, solid content: 87%), 13.5 parts of the coloring pigment dispersion 1, a light interference pigment in an amount of 10 parts by mass based on 100 parts by mass of the resin solid content, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water, affording a water-borne base coating composition having a resin solid concentration of 24.5% by mass.

(2) Formation of Multilayer Coating Film

A cationic electrodeposition coating composition "Power Top U-50" (manufactured by Nippon Paint Automotive Coatings Co., Ltd.) was applied to a dull steel sheet treated with zinc phosphate and having a thickness of 0.8 mm, a length of 30 cm, and a width of 40 cm by electrodeposition coating such that a dry film thickness was 20 μm, and then was baked at 160° C. for 30 minutes. To the resulting coated sheet, an intermediate coating composition "OP-30P Middle Gray" (polyester-melamine-based coating material manufactured by Nippon Paint Automotive Coatings Co., Ltd., diluted in advance for 25 seconds (measured at 20° C. using No. 4 Ford cup)) was air-spray applied with an air spray gun W-101-132G manufactured by ANEST IWATA Corporation such that the dry film thickness was 35 μm, and then baked and cured at 140° C. for 30 minutes. In this way, an article to be coated having an electrodeposition coating film and an intermediate coating film was obtained.

The aqueous base coating composition was air-spray applied to the article to be coated under conditions of a room temperature of 23° C. and a humidity of 68% such that the dry film thickness was 15 μm. After setting for 4 minutes, preheating was performed at 80° C. for 5 minutes.

The coated sheet was allowed to cool to room temperature, a clear coating composition (MACFLOW-O-1810 (a solvent type clear coating material manufactured by Nippon Paint Automotive Coatings Co., Ltd.)) was air-spray applied such that the dry film thickness was 35 μm, and then set for 7 minutes. Then, the coated sheet was baked with a dryer at 140° C. for 30 minutes, affording a coated article having a multilayer coating film composed of a base coating film and a clear coating film.

Example 2

A water-borne base coating composition and a coated article were obtained by the same procedure as in Example 1 except that the coloring pigment dispersion 1 was not blended.

Comparative Example 1

(1) Preparation of Base Coating Composition (1-1) Preparation of Coloring Pigment Dispersion 2

76.8 parts of the water-soluble acrylic resin solution obtained in Production Example 3, 11.7 parts of perylene red (coloring pigment), 12.5 parts of anchor red (coloring pigment), 3.0 parts of carbon black (coloring pigment), 16.0 parts of titanium oxide (coloring pigment), 22.7 parts of a pigment dispersant, 59.0 parts of ion-exchanged water, and 0.6 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 2.

(1-2) Preparation of Base Coating Composition 143.3 parts of the acrylic resin emulsion of Production Example 1, 1.4 parts of dimethylaminoethanol, 35.6 parts of CYMEL 370N (curing agent, solid content: 87%), 89.4 parts of the coloring pigment dispersion 2, another light interference pigment 1 in an amount of 1.4 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a water-borne base coating composition having a resin solid concentration of 24.5% by mass was prepared.

(2) Formation of Multilayer Coating Film

Using the aqueous base coating composition obtained in the above preparation, a coated article having a multilayer coating film was obtained by the same procedure as in Example 1.

Comparative Example 2

(1) Preparation of Base Coating Composition (1-1) Preparation of Coloring Pigment Dispersion 3

59.8 parts of the water-soluble acrylic resin solution obtained in Production Example 3, 11.7 parts of perylene red (coloring pigment), 6.3 parts of carbon black (coloring pigment), 25.3 parts of a pigment dispersant, 56.8 parts of ion-exchanged water, and 0.8 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 3.

(1-2) Preparation of Base Coating Composition 143.3 parts of the acrylic resin emulsion of Production Example 1, 1.4 parts of dimethylaminoethanol, 35.6 parts of CYMEL 370N (curing agent, solid content: 87%), 56.1 parts of the coloring pigment dispersion 3, another light interference pigment 2 in an amount of 6.2 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a water-borne base coating composition having a resin solid concentration of 24.5% by mass was prepared.

(2) Formation of Multilayer Coating Film

Using the aqueous base coating composition obtained in the above preparation, a coated article having a multilayer coating film was obtained by the same procedure as in Example 1.

Comparative Example 3

(1) Preparation of Base Coating Composition
(1-1) Preparation of Coloring Pigment Dispersion 4

74.1 parts of the water-soluble acrylic resin solution obtained in Production Example 3, 3.1 parts of perylene red (coloring pigment), 13.1 parts of anchor red (coloring pigment), 10.4 parts of carbon black (coloring pigment), 2.8 parts of titanium oxide (coloring pigment), 24.1 parts of a pigment dispersant, 56.3 parts of ion-exchanged water, and 0.6 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 4.

(1-2) Preparation of Base Coating Composition 143.3 parts of the acrylic resin emulsion of Production Example 1, 1.4 parts of dimethylaminoethanol, 35.6 parts of CYMEL 370N (curing agent, solid content: 87%), 16.7 parts of the coloring pigment dispersion 4, another light interference pigment 3 in an amount of 6.6 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a water-borne base coating composition having a resin solid concentration of 24.5% by mass was prepared.

(2) Formation of Multilayer Coating Film

Using the aqueous base coating composition obtained in the above preparation, a coated article having a multilayer coating film was obtained by the same procedure as in Example 1.

Comparative Example 4

(1) Preparation of Base Coating Composition
(1-1) Preparation of Coloring Pigment Dispersion 5

34.5 parts of the water-soluble acrylic resin solution obtained in Production Example 3, 10.4 parts of carbon black (coloring pigment), 18.6 parts of a pigment dispersant, 36.0 parts of ion-exchanged water, and 0.5 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 5.

(1-2) Preparation of Base Coating Composition 133.3 parts of the acrylic resin emulsion of Production Example 1, 9.0 parts of dimethylaminoethanol, 35.6 parts of CYMEL 370N (curing agent, solid content: 87%), 43.2 parts of the coloring pigment dispersion 5, another light interference pigment 3 in an amount of 0.8 parts by mass based on 100 parts by mass of the resin solid, still another light interference pigment 4 in an amount of 3.1 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a water-borne base coating composition having a resin solid concentration of 24.5% by mass was prepared.

(2) Formation of Multilayer Coating Film

Using the water-borne base coating composition obtained in the above preparation, a coated article having a multilayer coating film was obtained by the same procedure as in Example 1.

Example 3

(1) Preparation of First Base Coating Composition
(1-1) Preparation of Coloring Pigment Dispersion 6

78.3 parts of the water-soluble acrylic resin solution obtained in Production Example 3, 11.5 parts of perylene red (coloring pigment), 10.4 parts of carbon black (coloring pigment), 2.0 parts of Hostaperm Violet (coloring pigment), 1.4 parts of Cyanine Blue (coloring pigment), 34.3 parts of DISPEX ULTRA PA 4550 as a pigment dispersant, 81.3 parts of ion-exchanged water, and 1.1 parts of BYK-011 as an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 6.

(1-2) Preparation of First Base Coating Composition 122.1 parts of the acrylic resin emulsion of Production Example 1, 2.0 parts of dimethylaminoethanol, 35.6 parts of CYMEL 370N (curing agent, solid content: 87%), 102.0 parts of the coloring pigment dispersion 6, a paste containing a glitter with no light interference (active ingredient content: 60%) in an amount of 2.1 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a first base coating composition having a resin solid concentration of 19.9% by mass was prepared.

(2) Preparation of Second Base Coating Composition 143.3 parts of the acrylic resin emulsion of Production Example 1, 1.4 parts of dimethylaminoethanol, 35.6 parts of CYMEL 370N (curing agent, solid content: 87%), a light interference pigment in an amount of 30 parts by mass based on 100 parts by mass of the resin solid content, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a second water-borne base coating composition having a resin solid concentration of 11.0% by mass was prepared.

(3) Formation of Multilayer Coating Film

In the same manner as in Example 1, an article to be coated having an electrodeposition coating film and an intermediate coating film was obtained.

The first base coating composition prepared as described above was air-spray applied to the article to be coated under conditions of a room temperature of 23° C. and a humidity of 68% such that the dry film thickness was 8 μm. After setting for 4 minutes, preheating was performed at 80° C. for 5 minutes.

Subsequently, the second water-borne base coating composition prepared as described above was air-spray applied wet-on-wet to the article to be coated under conditions of a room temperature of 23° C. and a humidity of 68% such that the dry film thickness was 4 μm. After setting for 4 minutes, preheating was performed at 80° C. for 5 minutes.

The coated sheet was allowed to cool to room temperature, a clear coating composition was air-spray applied in the same manner as in Example 1, affording a coated article having a multilayer coating film composed of a first base coating film, a second base coating film, and a clear coating film.

Example 4

A multilayer coating film was formed by the same procedure as in Example 3 except that a water-borne second base coating composition prepared as described below was used.
(2) Preparation of Second Base Coating Composition
(2-1) Preparation of Coloring Pigment Dispersion 7

38.9 parts of the water-soluble acrylic resin solution obtained in Production Example 3, 11.7 parts of perylene red (coloring pigment), 14.0 parts of a pigment dispersant, 34.9 parts of ion-exchanged water, and 0.5 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 7.
(2-2) Preparation of Second Base Coating Composition 143.3 parts of the acrylic resin emulsion of Production Example 1, 1.4 parts of dimethylaminoethanol, 35.6 parts of CYMEL 370N (curing agent, solid content: 87%), 8.5 parts of the coloring pigment dispersion 7, a light interference pigment in an amount of 29.5 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a second water-borne base coating composition having a resin solid concentration of 11.0% by mass was prepared.

Comparative Example 5

(1) Preparation of First Base Coating Composition
(1-1) Preparation of Coloring Pigment Dispersion 8

72.6 parts of the water-soluble acrylic resin solution obtained in Production Example 3, 11.5 parts of perylene red (coloring pigment), 10.4 parts of carbon black (coloring pigment), 32.3 parts of a pigment dispersant, 70.2 parts of ion-exchanged water, and 1.0 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 8.
(1-2) Preparation of First Base Coating Composition 122.1 parts of the acrylic resin emulsion of Production Example 1, 2.0 parts of dimethylaminoethanol, 35.6 parts of CYMEL 370N (curing agent, solid content: 87%), 95.8 parts of the coloring pigment dispersion 8, a paste containing a glitter with no light interference (active ingredient content: 60%) in an amount of 2.1 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a first base coating composition having a resin solid concentration of 19.9% by mass was prepared.
(2) Preparation of Second Base Coating Composition
(2-1) Preparation of Coloring Pigment Dispersion 9

94.2 parts of the water-soluble acrylic resin solution obtained in Production Example 3, 10.1 parts of perylene red (coloring pigment), 24.4 parts of anchor red (coloring pigment), 1.9 parts of carbon black (coloring pigment), 18.0 parts of a pigment dispersant, 55.9 parts of ion-exchanged water, and 0.5 parts of an antifoaming agent were mixed with a stirrer such as a disper. Subsequently, the mixture was dispersed with a dispersing device packed with 0.05 mm zirconia beads as a medium in a volume packing ratio of 70%, affording a coloring pigment dispersion 9.
(2-2) Preparation of Second Base Coating Composition 143.3 parts of the acrylic resin emulsion of Production Example 1, 1.4 parts of dimethylaminoethanol, 35.6 parts of CYMEL 370N (curing agent, solid content: 87%), 37.2 parts of the coloring pigment dispersion 9, another light interference pigment 2 in an amount of 15 parts by mass based on 100 parts by mass of the resin solid, 5 parts of the phosphoric acid group-containing organic compound of Production Example 2, 0.4 parts of lauryl acid phosphate, 50 parts of butyl cellosolve, 5.5 parts of NOIGEN EA-207D (surfactant, solid content: 55%), and 3 parts of linoleic acid were uniformly dispersed. Dimethylaminoethanol was added to adjust the pH to 8.1, and then the resulting mixture was diluted with deionized water. Thus a second water-borne base coating composition having a resin solid concentration of 11.0% by mass was prepared.
(3) Formation of Multilayer Coating Film A multilayer coating film was formed by the same procedure as in Example 3 except that the first and second base coating compositions described above was used.
[Evaluation]

Using the multilayer coating films obtained in the examples and the comparative examples, the following evaluations were carried out. The results of the evaluations are shown in the following tables.
(1) Spectral Reflectance, Lightness, and Chroma Using a spectrophotometer "BYK-mac i" manufactured by BYK-Gardner, the spectral reflectance, the chroma and the lightness in the L*C*h color system attained when light $I_{45}$ striking from the clear coating film side at an angle of 45 degrees with respect to the coated article was received at angles of −15 degrees, 15 degrees, and 45 degrees with respect to the specular light were acquired. Average values of five different samples are defined as chroma $C^*_{-15}$, $C^*_{15}$, $C^*_{45}$, and lightness $L^*_{-15}$, $L^*_{15}$.

(2) Coating Film Appearance

Each of the multilayer coating films obtained in the examples and the comparative examples was viewed from the vicinity of an incident angle of 450 and a light receiving angle of −15°. Thereafter, the multilayer coating film was moved such that the light receiving angle increased, and was visually observed and evaluated according to the following criteria.

Evaluation Criteria

A: Vividness is felt in the vicinity of the light receiving angle of −15°, but as the light receiving angle is increased, chroma gets to be less felt and a change in chroma is clearly recognized.

B: Some vividness is felt in the vicinity of the light receiving angle of −15°, but as the light receiving angle is increased, some decrease in chroma is recognized.

C: Even if the light receiving angle is increased from −15°, no change in chroma is recognized.

TABLE 2

|  |  |  | Example 1 | Example 2 | Comparative Example 1 | Comparative Example 2 | Comparative Example 3 | Comparative Example 4 |
|---|---|---|---|---|---|---|---|---|
| Base coating film | Light interference pigment |  | 10.0 | 10.0 |  |  |  |  |
|  | Other light interference pigments | 1 |  |  | 1.4 |  |  |  |
|  |  | 2 |  |  |  | 6.2 |  |  |
|  |  | 3 |  |  |  |  | 6.6 | 0.8 |
|  |  | 4 |  |  |  |  |  | 3.1 |
|  | Coloring pigment | 1 |  |  | 4.1 | 3.3 | 0.7 |  |
|  |  | 2 |  |  | 2.1 |  | 1.4 |  |
|  |  | 3 | 1.0 |  | 1.2 | 2.0 | 2.6 | 3.2 |
|  |  | 4 |  |  | 0.9 |  | 0.1 |  |
|  | Thickness (μm) |  | 15 | 15 | 15 | 15 | 15 | 15 |
| Evaluation | C*−15 |  | 71.48 | 91.28 | 40.68 | 11.87 | 26.3 | 8.36 |
|  | C*15 |  | 30.54 | 34.1 | 32.94 | 11.26 | 24.2 | 8.23 |
|  | C*45 |  | 0.98 | 2.64 | 11.64 | 5.77 | 4.02 | 0.46 |
|  | (C*−15) − (C*15) |  | 40.94 | 57.18 | 7.74 | 0.61 | 2.1 | 0.13 |
|  | L*−15 |  | 48.47 | 69.92 | 29.48 | 21.83 | 22.33 | 12.57 |
|  | L*15 |  | 23.26 | 35.82 | 20.81 | 20.73 | 17.98 | 7.62 |
|  | (L*−15) − (L*15) |  | 25.21 | 34.1 | 8.67 | 1.1 | 4.35 | 4.95 |
|  | SR−15 |  | 69.4 | 156.43 | 17.77 | 9.77 | 10.6 | 2.45 |
|  | SR15 |  | 29.19 | 45.74 | 13.66 | 8.02 | 8.58 | 1.62 |
|  | (SR−15) − (SR15) |  | 40.21 | 110.69 | 4.11 | 1.75 | 2.02 | 0.83 |
|  | W−15 |  | 650 | 640 | 650 | 700 | 670 | 650 |
|  | W15 |  | 700 | 700 | 700 | 700 | 690 | 680 |
|  | \|(W−15) − (W15)\| |  | 50 | 60 | 50 | 0 | 20 | 30 |
|  | Visual evaluation |  | A | A | B | C | C | C |

TABLE 3

|  |  |  | Example 3 | Example 4 | Comparative Example 5 |
|---|---|---|---|---|---|
| First base coating film | Glitter |  | 2.1 | 2.1 | 2.1 |
|  | Coloring pigment | 1 | 3.4 | 3.4 | 3.5 |
|  |  | 3 | 3.5 | 3.5 | 3.5 |
|  |  | 5 | 0.4 | 0.4 |  |
|  |  | 6 | 0.4 | 0.4 |  |
|  | Thickness (μm) |  | 8 | 8 | 8 |
| Second base coating film | Light interference pigment |  | 30.0 | 29.5 |  |
|  | Other light interference pigments | 1 |  |  |  |
|  |  | 2 |  |  | 15.0 |
|  |  | 3 |  |  |  |
|  |  | 4 |  |  |  |
|  | Coloring pigment | 1 |  | 0.8 | 1.2 |
|  |  | 2 |  |  | 1.4 |
|  |  | 3 |  |  | 0.3 |
|  |  | 4 |  |  |  |
|  | Thickness (μm) |  | 4 | 4 | 4 |
| Evaluation | C*-15 |  | 72.48 | 76.69 | 24.44 |
|  | C*15 |  | 25.73 | 30.2 | 8.33 |
|  | C*45 |  | 5.91 | 8.29 | 11.16 |

TABLE 3-continued

|  | Example 3 | Example 4 | Comparative Example 5 |
|---|---|---|---|
| (C*-15)-(C*15) | 46.75 | 46.49 | 16.11 |
| L*-15 | 66.48 | 64.31 | 52.37 |
| L*15 | 42.12 | 39.95 | 46.62 |
| (L*-15)-(L*15) | 24.36 | 24.36 | 5.75 |
| SR-15 | 125.03 | 124.35 | 55.76 |
| SR15 | 51.45 | 51.46 | 40.82 |
| (SR-15)-(SR15) | 73.58 | 72.89 | 14.94 |
| W-15 | 650 | 650 | 700 |
| W15 | 700 | 700 | 700 |
| \|(W-15)-(W15)\| | 50 | 50 | 0 |
| Visual evaluation | A | A | B |

With the coating films of all the examples, the vividness greatly changed in a highlight region, and was recognized as almost achromatic in a face region.

With the coating films of Comparative Examples 1 and 5, when the light receiving angle was increased from the light receiving angle of −15°, a certain degree of change in chroma was recognized but the change was poor in the highlight region, whereas the coating films were not recognized as achromatic in their face regions.

With the coating films of Comparative Examples 2 to 4, a change in chroma was hardly recognized in their highlight regions.

The present disclosure includes the following embodiments.

[1]

A coating composition comprising a coating film-forming resin and a pigment, wherein a chroma $C^*_{-15}$ in an L*C*h color system based on a spectral reflectance of reflected light $R_{-15}$ having received, at an angle of −15 degrees with respect to specular light, incident light $I_{45}$ striking at an angle of 45 degrees with respect to a surface of a cured coating film of the coating composition and a chroma $C^*_{15}$ in an L*C*h color system based on a spectral reflectance of reflected light $R_{15}$ having received the incident light $I_{45}$ at an angle of 15 degrees with respect to the specular light satisfy relationships of:

$$C^*_{-15} > C^*_{15} > 10,$$

and $$C^*_{-15} - C^*_{15} > 20,$$

and a chroma $C^*_{45}$ in an L*C*h color system based on a spectral reflectance of reflected light $R_{45}$ having received the incident light $I_{45}$ at an angle of 45 degrees with respect to the specular light is 10 or less.

[2]
The coating composition according to the above [1], wherein the chroma $C^*_{-15}$ is 50 or more.

[3]
The coating composition according to the above [1] or [2], wherein the chroma $C^*_{15}$ is more than 10 and 40 or less.

[4]
The coating composition according to any one of the above [1] to [3], wherein
a lightness $L^*_{-15}$ based on a spectral reflectance of the reflected light $R_{-15}$ and a lightness $L^*_{15}$ based on a spectral reflectance of the reflected light $R_{15}$ satisfy a relationship of $$L^*_{-15} - L^*_{15} \geq 10.$$

[5]
The coating composition according to any one of the above [1] to [4], wherein
in a wavelength region of 400 nm to 700 nm,
a maximum spectral reflectance $SR_{-15}$ of the reflected light $R_{-15}$ and a spectral reflectance $SR_{15}$ of the reflected light $R_{15}$ at a wavelength at which the spectral reflectance $SR_{-15}$ of the reflected light $R_{-15}$ is maximized satisfy a relationship of $$SR_{-15} - SR_{15} \geq 20\ (\%).$$

[6]
The coating composition according to any one of the above [1] to [5], wherein
in a wavelength region of 400 nm to 700 nm,
a wavelength $W_{-15}$ at which a spectral reflectance $SR_{-15}$ of the reflected light $R_{-15}$ is maximized and a wavelength $W_{15}$ at which a spectral reflectance $SR_{15}$ of the reflected light $R_{15}$ is maximized satisfy a relationship of $$|W_{-15} - W_{15}| \geq 40\ (\text{nm}).$$

[7]
The coating composition according to any one of the above [1] to [6], wherein
the pigment includes a light interference scaly pigment, and
the light interference scaly pigment includes:
a scaly reflective base having a first surface and a second surface opposite with the first surface;
a first layer containing at least one selected from the group consisting of silicon dioxide, aluminum oxide, and metal fluoride; and
a second layer containing at least one selected from the group consisting of chromium, aluminum, silver, nickel, palladium, platinum, titanium, vanadium, cobalt, iron, tin, tungsten, molybdenum, rhodium, niobium, copper, and gold,
and on each of the first surface and the second surface, at least two of the first layer and at least two of the second layer are alternately disposed with one of the first layers being as an innermost layer.

[8]
A coated article comprising:
an article to be coated; and
a cured coating film of the coating composition according to any one of the above [1] to [7] provided on the article to be coated.

[9]
A method for producing a coated article, comprising applying the coating composition according to any one of the above [1] to [7] to an article to be coated, and then curing the coating composition.

INDUSTRIAL APPLICABILITY

The coated article of the present invention is suitable particularly as an outside plate of an automobile body.

This application claims priority based on Japanese Patent Application No. 2023-051982, which was filed in Japan on Mar. 28, 2023, the disclosure of which application is incorporated herein by reference in its entirety.

The invention claimed is:
1. A coating composition comprising a coating film-forming resin and a pigment,
wherein a chroma $C^*_{-15}$ in an L*C*h color system based on a spectral reflectance of reflected light $R_{-15}$ having received, at an angle of −15 degrees with respect to specular light, incident light $I_{45}$ striking at an angle of 45 degrees with respect to a surface of a cured coating film of the coating composition and a chroma $C^*_{15}$ in an L*C*h color system based on a spectral reflectance of reflected light $R_{15}$ having received the incident light $I_{45}$ at an angle of 15 degrees with respect to the specular light satisfy relationships of:
$C^*_{-15} > C^*_{15} > 10$, and
$C^*_{-15} - C^*_{15} > 20$,
and a chroma $C^*_{45}$ in an L*C*h color system based on a spectral reflectance of reflected light $R_{45}$ having received the incident light $I_{45}$ at an angle of 45 degrees with respect to the specular light is 10 or less, and
wherein
the pigment includes a light interference scaly pigment, and
the light interference scaly pigment includes:
a scaly reflective base having a first surface and a second surface opposite with the first surface;
a first layer containing at least one selected from the group consisting of silicon dioxide, aluminum oxide, and metal fluoride; and
a second layer containing at least one selected from the group consisting of chromium, aluminum, silver, nickel, palladium, platinum, titanium, vana- dium, cobalt, iron, tin, tungsten, molybdenum, rhodium, niobium, copper, and gold, and on each of the first surface and the second surface, at least two of the first layer and at least two of the second layer are alternately disposed with one of the first layers being as an innermost layer.

2. The coating composition according to claim 1, wherein the chroma $C^*_{-15}$ is 50 or more.

3. The coating composition according to claim 1, wherein the chroma $C^*_{15}$ is more than 10 and 40 or less.

4. The coating composition according to claim 1, wherein a lightness $L^*_{-15}$ based on a spectral reflectance of the reflected light $R_{-15}$ and a lightness $L^*_{15}$ based on a spectral reflectance of the reflected light $R_{15}$ satisfy a relationship of $L^*_{-15}$-$L_{15}$≥10.

5. The coating composition according to claim 1, wherein in a wavelength region of 400 nm to 700 nm, a maximum spectral reflectance $SR_{-15}$ of the reflected light $R_{-15}$ and a spectral reflectance $SR_{15}$ of the reflected light $R_{15}$ at a wavelength at which the spectral reflectance $SR_{-15}$ of the reflected light $R_{-15}$ is maximized satisfy a relationship of $SR_{-15}$-$SR_{15}$≥20%.

6. The coating composition according to claim 1, wherein in a wavelength region of 400 nm to 700 nm, a wavelength $W_{-15}$ at which a spectral reflectance $SR_{-15}$ of the reflected light $R_{-15}$ is maximized and a wavelength $W_{15}$ at which a spectral reflectance $SR_{15}$ of the reflected light $R_{15}$ is maximized satisfy a relationship of $|W_{-15}-W_{15}|$≥40 nm.

7. A coated article comprising:

an article to be coated; and a cured coating film of the coating composition according to claim 1 provided on the article to be coated.

8. A method for producing a coated article, comprising applying the coating composition according to claim 1 to an article to be coated, and then curing the coating composition.

* * * * *